Figure 1A:
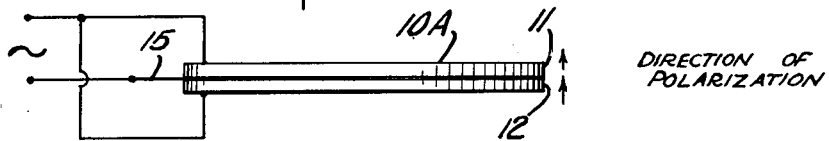

Sept. 11, 1962  E. J. PARSSINEN ETAL  3,054,084
BALANCED FLEXURAL ELECTROACOUSTIC TRANSDUCER
Filed Sept. 28, 1959  2 Sheets-Sheet 1

DIRECTION OF POLARIZATION

DIRECTION OF POLARIZATION

INVENTORS:
EDWIN J. PARSSINEN
HARVEY L. RATHBUN JR.
BY RALPH S. WOOLLETT

Max A. _____
ATTORNEYS:

Sept. 11, 1962  E. J. PARSSINEN ETAL  3,054,084
BALANCED FLEXURAL ELECTROACOUSTIC TRANSDUCER
Filed Sept. 28, 1959  2 Sheets-Sheet 2
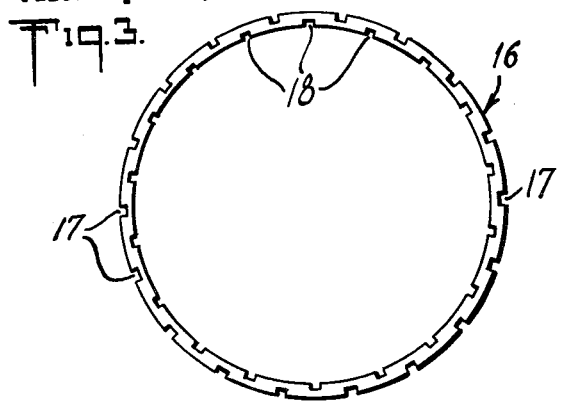
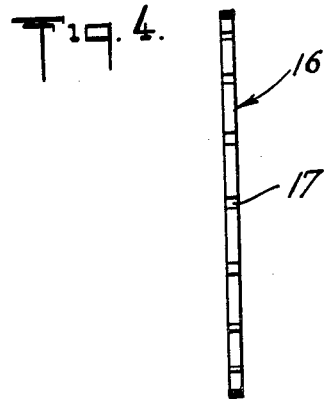
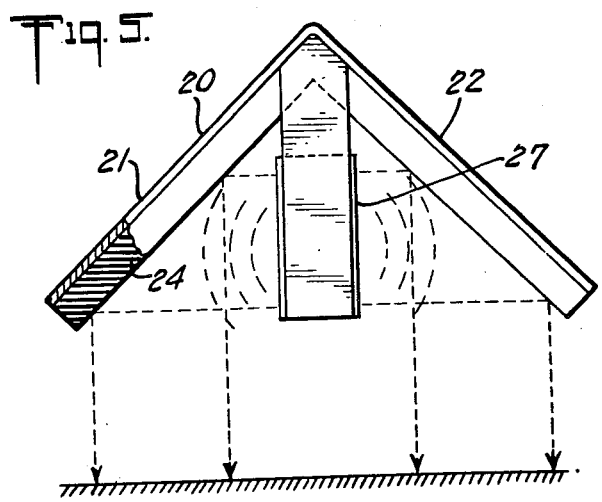
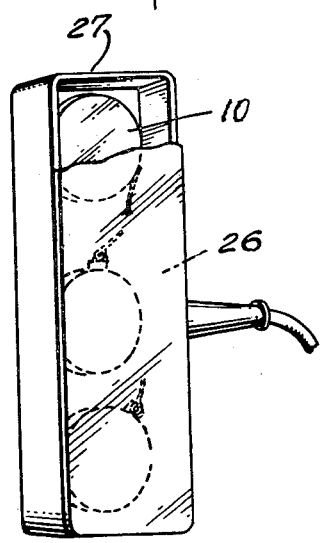
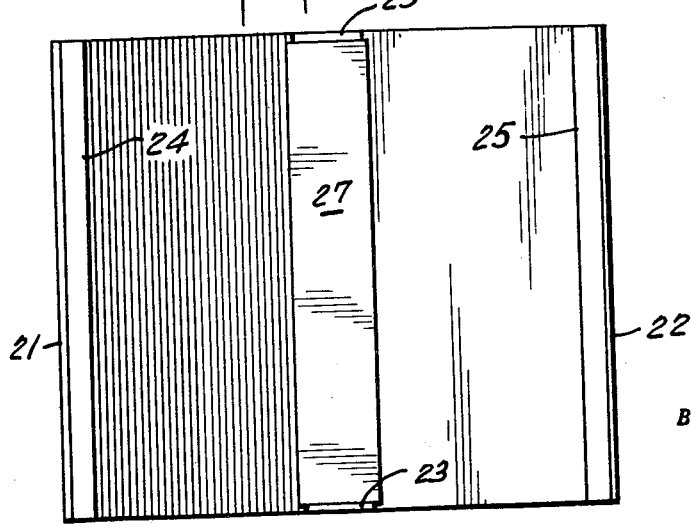
INVENTOR.
EDWIN J. PARSSINEN
HARVEY L. RATHBUN JR.
BY RALPH S. WOOLLETT.
ATTORNEYS.

United States Patent Office 3,054,084
Patented Sept. 11, 1962

3,054,084
BALANCED FLEXURAL ELECTROACOUSTIC TRANSDUCER
Edwin J. Parssinen, Mystic, Harvey L. Rathbun, Jr., Uncasville, and Ralph S. Woollett, New London, Conn., assignors to the United States of America as represented by the Secretary of the Navy
Filed Sept. 28, 1959, Ser. No. 843,026
9 Claims. (Cl. 340—8)
(Granted under Title 35, U.S. Code (1952), sec. 266)

The invention described herein may be manufactured and used by or for the Government of the United States of America for governmental purposes without the payment of any royalties thereon or therefor.

This invention relates to an electromechanical transducer for use in air or water as a hydrophone for converting compressional wave energy into alternating electrical energy and/or as a projector for converting alternating electrical energy into compressional wave energy, and more particularly to an improved electroacoustic communication transducer for the audio frequency band.

Efficiency of an electroacoustic transducer is highest at its resonant frequency. In previous transducers designed to be resonant at a selected frequency, the active elements generally were bar-shaped about one-half wavelength long, or cylindrical about one wavelength in circumference. In transducers designed for low frequencies, dimensions are large. For example, at 4500 cycles per second, one wavelength in barium titanate is about three feet. Therefore, the elements that were designed for audio frequencies were large, heavy, expensive and difficult to assemble in arrays for obtaining selective directional response. Additionally, the unicellular rubber they generally included as a pressure release material for isolation of selected portions of their surface area absorbed an objectionable amount of energy. Their mounts also absorbed an objectionable amount of energy.

An object of this invention is to provide an efficient, small lightweight, moderate power electromechanical audio frequency band transducer for use in air or water for converting alternating electrical energy to compressional wave energy in the surrounding medium and/or for converting incident compressional wave energy in the medium into alternating electrical energy and which can be used singly to give a pattern approaching that of a point source and which are small enough to be readily assembled in arrays or mounted in appropriate reflective baffles to give desired directional response, beam width, and power handling capabilities.

A further object is to provide improved multielement transducers in accordance with the preceding object.

A further object is to provide an improved underwater electroacoustic audio frequency communication transducer which is capable of operation at depths on the order of 200 feet.

A further object is to provide an improved audio frequency sound source for use in either air or water.

A further object is to provide a low loss element for mounting electromechanical transducers.

Figure 1B:
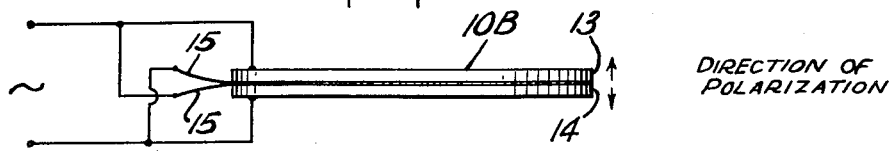
Figure 1C:
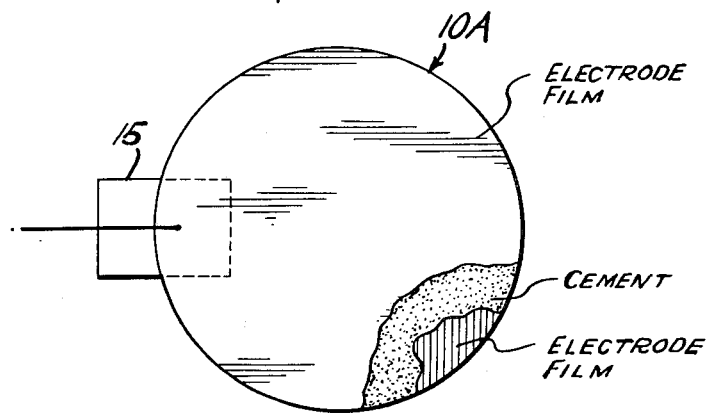
Figure 2:
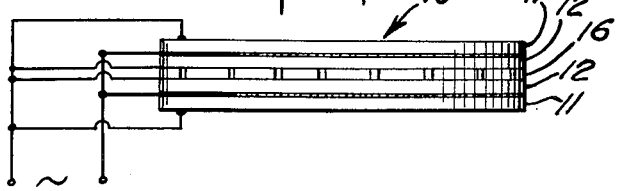

Other objects and many of the attendant advantages of this invention will be readily appreciated as the same becomes better understood by reference to the following detailed description when considered in connection with the accompanying drawings wherein:

FIGS. 1A and 1B show two examples of bilaminar transducer arrangements for this invention, FIG. 1C is a simplified plan view of arrangements shown in FIGS. 1A and 1B showing the upper electrode film of the upper transducer lamina, the cement and electrode between the laminae, and the upper electrode film of the lower lamina, FIG. 2 shows a double bilaminar transducer in accordance with this invention and including two transducers of the type shown in FIG. 1A, FIGS. 3 and 4 show plan and side views respectively of an embodiment of a spacer for the double bilaminar transducer of FIG. 2.

FIGS. 5 and 6 are top and front views of a directive transducer including elements of the type disclosed in the preceding figures, and FIG. 7 is a transducer subassembly for the directive transducer of FIGS. 5 and 6.

Broadly, this invention includes a pair of substantially identical thin elements, each of which are of the type that are deformable by an applied changing potential to manifest changing concavo-convex shape. The change in shape may be from flat shape (in the absence of applied potential or deforming force) to either bow-shape or dish-shape, or from bow-shape or dish-shape to greater or lesser bow-shape or dish-shape. The pair of elements are disposed in face-to-face alignment analogous to a pair of stacked coins, and means are secured to marginal areas of the pair of facing elements so that said marginal areas are spaced substantially a constant distance apart even when the elements are driven by an applied alternating potential and spaced far enough apart so that there is no engagement for selected range of applied forces and potentials. The marginal spacing preferably is uniform though useful results are obtained even if the spacing is relatively nonuniform. The elements of the transducer may be magnetostrictive, piezoelectric or electrostrictive but electrostrictive transducers have advantages or purposes of this invention because they can be readily made small, thin, and of the desired shape, are tough and require comparatively little driving power. The spacing means that attaches the pair of elements face to face is sufficiently stiff relative to anticipated axial and radial static force and axial dynamic force so that there is significant displacement therein as a result thereof, but is readily compliant to anticipated dynamic forces in directions normal to the spacing of the elements so as not to materially resist deformation of the elements to a significant degree when the elements are subjected to a selected range of driving alternating potential or a selected range of varying force. The in-line arrangement of the transducer elements and the spacing means is such that when a changing potential is applied to the electrical terminals of the combination, said elements deform toward and/or away from each other, with their movements being 180 degrees out-of-phase with respect to the spacing means attached to the marginal areas of said elements. The transducer in accordance with this invention uses air as a pressure release material on the non-radiating surface area (which in this invention is bordered by the spacing means), as opposed to the conventional use of unicellular rubber as a pressure release material, so that higher efficiency may be realized.

FIGS. 1A, 1B, and 1C illustrate bilaminar electrostrictive elements 10A and 10B that manifest dishing distortion in response to a driving alternating potential. Methods and materials for fabricating the laminae 11, 12, 13, 14, for electrostrictive elements 10A and 10B, are well known in the art. For example, U.S. Patent #2,486,560 describes electrostrictive transducers, particularly of barium titinate and methods of making the same, which description may be utilized for fabricating the transducer elements in FIGS. 1A–C. Also, a paper published by Sperry Gyroscope Company of Great Neck, New York, and presented at the 14th Annual National Electronics Conference, Chicago, Illinois, October 13, 1958, entitled "The Electro-Acoustic Transducer and Its Application to Sonar Systems," by George Rand and John Divine, includes further information on electrostrictive transducers and methods of making them. The laminae 11, 12, 13, 14, are conventionally fabricated of a material that is or that can be rendered electrostrictive and their opposed faces are coated with separate electrode films and are polarized transverse to the electrode films as is well known in the art, and the polarization may be carried out as described in the above-mentioned references. Paired laminae are bonded face-to-face with an adhesive. The particular adhesive is not critical but the following physical properties in the adhesive to some degree determine operational characteristics of the transducer. The more firmly that the adhesive bonds to the facing electrode surfaces of the electrostrictive element 10A or 10B and the tougher the adhesive, the greater the power handling capacity of the resultant transducer without rupturing at the adhesive bond. The greater the flexibility of the adhesive bond and the thinner the adhesive bond, the greater the efficiency of the transducer because less power is lost in driving the adhesive bond material. One example of a commercial adhesive that has satisfactory properties for the purpose described is "Eastman 910" cement. There is considerable literature on adhesives from which information on other satisfactory adhesives may be obtained. For example, a book entitled "Adhesives" by Felix Braude, published by Chemical Publishing Company, and a periodical entitled "Adhesives and Resins," published in Great Britain at 329 Gray's Inn Road, London, W.C. 1, provides information on adhesives and their properties from which information on other adhesives satisfactory for the purpose may be selected.

The arrangement shown in FIG. 1A wherein one terminal is connected to both facing electrodes is somewhat simpler to assemble than the arrangement in FIG. 1B. One bonding procedure that has proved satisfactory is to select a matched pair of electrode-surfaced and polarized laminae, apply adhesive to one face of each of the matched laminae, and with a thin flat strip of copper foil 15 disposed between the adhesive coated faces of the laminae, press the laminae firmly together. By applying pressure not only is a good adhesive bond obtained, but the copper foil 15 is forced into electrical contact with the facing film electrodes of the two laminae to a sufficient extent satisfactory for the purpose. Conductors are conventionally soldered to the outside film electrodes and are connected in common to provide one electrical terminal of the transducer, and the foil 15 or a conductor connected to the foil 15 provides the other electrical terminal of the transducer. In FIG. 1B where the assembly is such that the directions of polarization are opposite, the facing electrode surfaces of the two laminae are not commonly connected. Two strips of conductive foil 15 are each coated on one face with a non-conductive film. The uncoated conductive face of each foil 15 is bonded to one electrode surface of a respective one of the two laminae. Then that face of one of the laminae having the strip thereon is coated with a non-conducting film. Then those faces of the two laminae bearing the strips are coated with adhesive and the laminae are bonded face-to-face with the two copper foils therebetween but preferably not overlapping. Each foil electrically contacts one only of the facing electrode surfaces. The conductors are connected as shown in FIG. 1B, whereby alternating potential may be applied across both laminae simultaneously.

A less efficient form of this transducer can be formed by using only one electrostrictive lamina in each bilaminar combination, the other lamina being of a rigid metal or even of the same material as the electrostrictive lamina but non-electroded and non-polarized.

When an alternating voltage is applied to a bilaminar disk of the type shown in FIG. 1A or 1B, strains, e.g. contraction and expansion along the disk radius, develop in the laminae of the bilaminar disk. Because the radial strains in the laminae are in opposite directions, the bilaminar disk flexes or dishes similar to a bimetallic element in changing temperature. If the marginal area of the bilaminar disk is firmly clamped, a diaphragm action results. If changing pressure is applied to one of the bilaminar disk faces, a changing voltage is developed across the electrodes of the disk. The resonant frequency of the disk is a function of thickness and diameter of the disk. However, firmly clamping the marginal area of the disk causes energy to be uselessly dissipated at the clamp. This disadvantage is obviated in this invention by the arrangement described below.

FIG. 2 shows two transducer elements of the type shown in FIG. 1A and a spacer 16, attached together in line. A spacer that gives satisfactory results for the purposes set forth previously is shown in FIGS. 3 and 4. The spacer 16 in FIGS. 3 and 4 is a ring formed with slots 17 and 18 on its inner and outer surfaces at equi-angularly spaced intervals and consecutive angularly spaced slots occurring alternately on the inner and outer surfaces. The ring 16 may be formed from a stiff resilient material, e.g. brass tube stock, e.g. SAE 74. To form the ring, a length of the tubing stock is mounted in a band saw with an indexing means and its outer surface is formed with the slots 17. To form the inside slots, the cutting saw band is severed, threaded through the tubing, and its ends welded together and with the aid of indexing means the inner surface of the tubing is formed with slots 18, between each pair of slots 17. The wall thickness of the tubing is about $\frac{1}{8}$ inch and slot depth is on the order of $\frac{1}{32}$ inch. Successive slots may be on the order of ten degrees apart, the slot spacing is related to the circumferential length of the ring. For a 1½ inch ring diameter, ten degree slot spacing is suitable. After the tube stock is slotted, the tubing is sawed into thin rings. The ring thickness may be on the order of $\frac{1}{16}$ inch. Two transducer elements 10 are so arranged on opposite sides of the ring for flexure in opposite directions when an alternating potential is applied and the ring is bonded to the marginal areas of the inner faces of both transducer elements 10; an air space is sealed in between the transducer elements 10. The spacing ring is radially compliant to dynamic forces but is radially stiff to static forces, and it has high dynamic and static stiffness in the axial direction. The radially compliant support afforded by the slotted ring endows the double bilaminar disk with excellent electromechanical transducing properties. The strain and the forces developed in one disk correspond to that in the other disk and with a radially compliant ring therebetween efficiency is high. If the metal ring were not radially compliant, i.e., if the ring were not slotted, it would prevent radial motion of the disk edges when excited by an applied alternating potential and would thereby inhibit or even prevent bending or dishing action. Because the ring has high dynamic stiffness in the axial direction, each disk has, at its bonded margin, a node of axial motion. If the ring material were very compliant axially, for example, if it were of rubber to provide good radial compliance, then the nodal circle of axial motion for each disk would move inwardly from the edge of the disk, and the portion of the disk outside of this circle would vibrate out of phase, resulting in poor radiation loading.

With the above arrangement there is obtained an electroacoustic transducer with high electromechanical coupling coefficient and with high strength.

When an alternating potential is applied to the double bilaminar transducer shown in FIG. 2 to drive the elements 10 in the fundamental flexural mode, each element 10 manifests a dish-like distortion. The electrical connections to the electrodes and the directions of polarization are such that distortion in the two bilaminar disks are 180 degrees out of phase. By driving two bilaminar elements back to back as edge supported disks, the transducer radiates from both outer faces. Substantially no energy is consumed by the included air space. This unit when placed in a medium such as water will couple most of the acoustic energy into the water with little loss in the included air cavity pressure release. This arrangement has the advantages of transducer elements anchored with heavy mounting fixtures without the disadvantages.

The mechanical resonance of the described transducer is determined by the physical dimensions of the disks. The first resonant frequency of the mode of an edge supported diaphragm is defined as follows:

$$f = 0.226 \frac{t}{R^2} cp$$

where $$cp = \sqrt{\frac{E}{\rho(1-\sigma^2)}}$$

$f$ = resonant frequency c.p.s.
$t$ = thickness
$R$ = Radius
$cp$ = velocity of sound in the material
$E$ = modulus of elasticity
$\rho$ = density of the material
$\sigma$ = Poisson's ratio A transducer in accordance with this invention designed for resonance at about 9 kc. is about 1½ inches outside diameter and slightly more than 3/16 inch thick overall. Because of small size and light weight, the transducers can be assembled in arrays or mounted in appropriate reflective baffles to give desired beam width and power handling capabilities. The transducing material is used to best advantage; substantially all of it is effective. Because the two opposed faces of the transducer radiate acoustic energy when alternating potential is applied, the radiation loading that is obtained is greater than for a disk radiating from only one surface resulting in higher electroacoustic efficiency. A transducer as above operated singly provides a pattern which is approximately omnidirectional and which approaches that of a spherical sound source.

FIGS. 5 and 6 show a directional transducer having several transducing units 10 as described above mounted in a reflective corner baffle. It includes a rigid frame 20 that is of a material that resists corrosion under the conditions where used and having two walls 21 and 22 intersecting at 90 degrees and having a pair of rigid support bars 23 at each end that are equiangularly spaced from the walls 21 and 22. A layer of conventional compressional wave reflective material 24 is bonded to the inner surfaces of the walls 21 and 22 of the frame 20 and having substantially planar reflecting surfaces intersecting at 90°. Two properties of the material selected for layer 24 should be greatly different from the corresponding properties of the medium in which the assembly is used, namely, density and the velocity of compressional wave energy therethrough. "Isoper," a product of B. F. Goodrich Industrial Prod. Company, Akron, Ohio, which is a relatively stiff rubber-like material, is an example of a suitable commercial material for layer 24 where the assembly is for use in water. A plurality of substantially identical transducers 10 as in FIG. 2, electrically connected in parallel, are embedded in electrically insulating acoustically transparent material 26 with corresponding faces of transducers 10 coplanar, within a rectangular frame 27 and the subassembly shown in FIG. 7 is secured to and extends between the bars 23 of the frame 20. The lightweight sound reflector 20, 24 has an effective radiating area for the active elements that is substantially larger than the face areas of transducers 10 and providing a unidirectional beam pattern that can be modified to some extent by changing the size of the reflector. The corner reflector or baffle improves the impedance match between the transducers and the water which in turn permits higher radiation loading and higher efficiency.

Obviously many modifications and variations of the present invention are possible in the light of the above teachings. It is therefore to be understood that within the scope of the appended claims the invention may be practiced otherwise than as specifically described.

We claim:
1. An electromechanical transducer for use under conditions where the range of force levels in the transducer and the range of potentials on the transducer is predetermined, comprising a pair of substantially identical thin elements of the type which are deformable by applied changing potential to manifest changing concavo-convex shape, and when deformed by changing applied force in turn providing a potential that changes as a function of the applied force, said elements being disposed in face-to-face alignment, means secured to corresponding marginal areas of said elements and spacing said corresponding marginal areas a uniform distance apart, the spacing being sufficient to preclude engagement of said elements when used under the aforementioned conditions, said means being sufficiently compliant to said predetermined force levels directed normal to said spacing to present comparatively low resistance to deformation of said elements in directions normal to their spacing, said means being sufficiently stiff in the spacing direction to substantially completely preclude significant change in the spacing of said corresponding marginal areas of said pair of elements during the occurrence of said predetermined force levels, whereby identical changing potentials can be concurrently applied to both said elements to cause said elements to deform toward and/or away from each other so that their movements are 180 degrees out of phase relative to said spacing means.

2. An electromechanical transducer as defined in claim 1, wherein said means is an apertured thin-walled peripherally closed member.

3. An electromechanical transducer as defined in claim 2, wherein said elements are substantially disk-shaped.

4. An electromechanical transducer comprising a pair of substantially identical electrostrictive disk elements each having a pair of electrical terminals and responsive to alternating potential applied to said terminals to alternately dish in one direction and in the other direction in accordance with the polarity and amplitude of the applied alternating potential, a radially-compliant axially-stiff ring of approximately the same outside diameter as said disk elements and affixed marginally to both said disk elements with an air space between said disk elements whereby identical alternating potentials can be applied concurrently to the terminals of both disks to cause said disks to alternately dish toward and away from one another.

5. An electromechanical transducer of high efficiency comprising a pair of substantially identical electrostrictive thin disk elements of the type wherein the relative radial dimensions of the opposed faces of each disk change in opposite phase in response to an applied alternating potential to manifest changing concavo-convex shape and of the type wherein deformation by applied force is accompanied by an output potential varying with the deformation, an axially-stiff radially-compliant ring of substantially the same outside diameter as the outside diameter of said disk elements disposed between and bonded to marginal areas of both said disk elements to space said marginal areas a substantially constant distance apart and presenting minimum resistance to strain in said disk elements, whereby identical alternating potentials can be applied to both said elements to cause said elements to dish inwardly toward each other and outwardly away from each other 180 degrees out of phase relative to said ring.

6. An electromechanical transducer as defined in claim 5, wherein the wall of said ring is formed with equiangularly spaced longitudinal slots, the successive slots being alternately in the inner surface and in the outer surface of the ring, the slotted wall portions of said ring contributing to radial compliance thereof, the portions of the wall of said ring between adjacent slots contributing to axial stiffness and radial rigidity under static pressure loading.

7. An electromechanical transducer as defined in claim 6, further including an electrically nonconducting material whose density and sound velocity characteristics closely match the corresponding properties of water, embedding and completely surrounding the disk-ring-disk stacked transducer assembly whereby said transducer is adapted for use under water.

8. An electromechanical transducer as defined in claim 7, in combination with a corner reflector having two substantially planar reflecting surfaces intersecting at 90°, said reflecting surfaces being of a material whose density and sound transmitting properties differ substantially from the corresponding properties of water, means supporting said embedded transducer on said reflector with the outer faces of said disk elements facing toward and equiangularly spaced from the respective reflecting surfaces.

9. An electromechanical transducer as defined in claim 4 wherein said ring comprises a thin walled continuous ring of a stiff but resilient material having opposed end surfaces that are substantially normal to the axis of the ring, said ring being formed with approximately axial recesses extending from end surface to end surface and distributed around the ring, whereby said ring is capable of forming together with said disk-like elements a sealed-in air space.

References Cited in the file of this patent

UNITED STATES PATENTS

| | | |
|---|---|---|
| 1,985,251 | Hayes | Dec. 25, 1934 |
| 2,126,436 | Williams | Aug. 9, 1938 |
| 2,332,541 | Turner | Oct. 26, 1943 |
| 2,406,119 | Williams et al. | Aug. 20, 1946 |
| 2,448,365 | Gillespie | Aug. 31, 1948 |

FOREIGN PATENTS

| | | |
|---|---|---|
| 1,005,324 | Germany | Mar. 28, 1957 |